April 1, 1958     J. M. CLUWEN     2,829,327
MAGNETIC DEVICE FOR CONVERTING A FIRST ROTARY
MOTION INTO A SECOND ROTARY
MOTION OF LOWER SPEED
Filed July 12, 1954
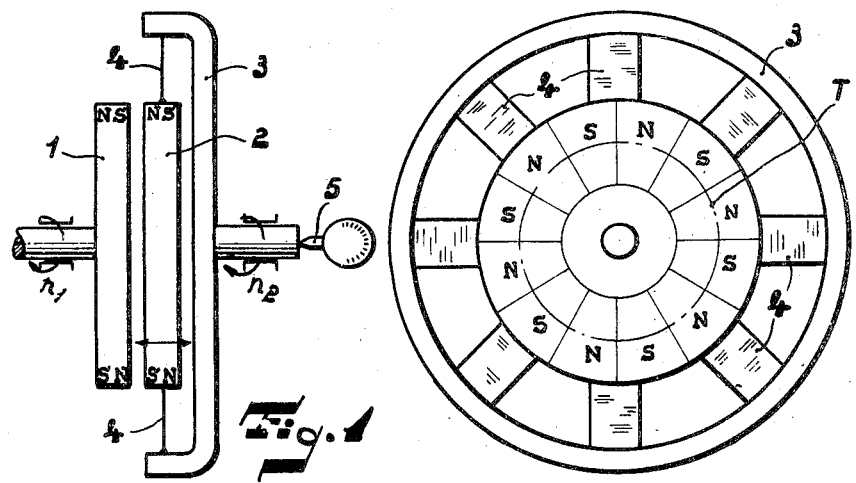
Fig. 1
Fig. 2
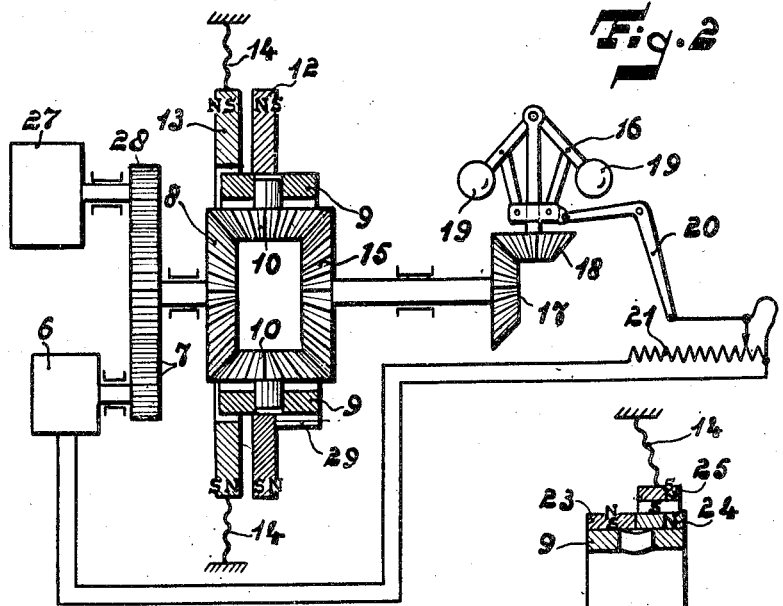
Fig. 3
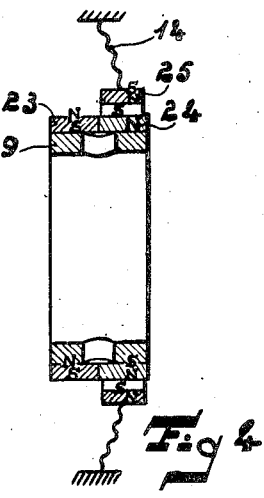
Fig. 4

United States Patent Office 2,829,327
Patented Apr. 1, 1958

2,829,327

MAGNETIC DEVICE FOR CONVERTING A FIRST ROTARY MOTION INTO A SECOND ROTARY MOTION OF LOWER SPEED

Johannes Meijer Cluwen, Eindhoven, Netherlands, assignor, by mesne assignments, to North American Philips Company, Inc., New York, N. Y., a corporation of Delaware Application July 12, 1954, Serial No. 442,678

Claims priority, application Netherlands July 21, 1953

6 Claims. (Cl. 318—325)

The invention relates to a device for converting a first rotary motion into a second rotary motion having a lower number of revolutions. In accordance with the invention the first rotary movement is transferred to the first part of a mechanical resonance system comprising two parts, these parts vibrating relatively to one another in a frequency of substantially the mechanical resonance frequency of the system and thus rotating relatively to one another with a number of revolutions determined substantially only by this resonance frequency, the second rotary movement being derived from the latter rotation.

Since the resonance frequency of a system is given and the difference between the speed of the second rotary movement and the first rotary movement is directly proportional to the resonance frequency of the system, the advantage is obtained that absolute variations of the number of revolutions of the first rotation are transferred unchanged to the speed of the second rotation. Thus the relative speed variation of the first rotation will be manifest as an increased relative speed variation in the second rotation. The aforesaid device is thus particularly suitable for measuring variations in the number of revolutions and for stabilizing the number of revolutions of the driving device.

The invention will now be described with reference to the accompanying drawing, the figures of which show diagrammatically a few embodiments thereof, given by way of example.

Fig. 1 shows a device according to the invention, comprising two disc-shaped arrangements of permanent magnets, of which one is suspended resiliently only in an axial direction.

Fig. 2 is a view in axial direction of the magnet arrangement shown in Fig. 1, which is suspended resiliently.

Fig. 3 shows a device similar to that shown in Fig. 1, in which the driving is transmitted through a differential, the second rotary movement including a regulator reacting upon a control-device controlling the speed of a motor and Fig. 4 shows part of a variant of the embodiment shown in Fig. 3, in which use is made of cylindrical permanent magnet arrangements.

Referring to Fig. 1 the device comprises a first mechanism 1, which rotates, this rotation being converted, in accordance with the invention, in a manner such that a mechanism 2 performs both a rotary movement and a vibrating movement. The mechanism 2 is, to this end, readily movable in an axial direction and suspended rigidly in a tangential direction in a rotor 3 in a manner such that a torque can be transmitted. To this end, as is shown in Fig. 2, the mechanism 2 is provided at the periphery with blade springs 4, the other ends of which are secured to the cover 3. Both the mechanism 1 and the mechanism 2 are constituted by a disc-shaped arrangement of permanent magnetic material, in which poles N and S are magnetized in an axial direction, these poles producing a magnetic field of alternating directions measured along a pitch line T. Both the mechanism 1 and the rotor 3 are journalled in a manner such that a movement in an axial direction is prevented. If the mechanism 1 rotates with a speed $n_1$, the mechanism 2, having a speed $n_2$ lower than $n_1$, can rotate in synchronism with the mechanism 1, if the difference $n_1-n_2$ corresponds to the mechanical resonance frequency of the system comprising the mechanisms 1 and 2. By correct choice of the mass associated with the rotor 3 and, if necessary, by braking the rotor 3, when the mechanism 1 starts, the mechanism 2 may be prevented from assuming the same speed as the mechanism 1. The load coupled with the rotor 3 lies preferably in the proximity of half of the maximum moment of loading of the resonance system.

In a given system having a constant mechanical resonance frequency, deviations $\Delta n$ from the speed of rotation $n_1$ will be transmitted unchanged to the second mechanism 2. The relative deviation from the speed $$\frac{\Delta n}{n_1}$$

of the mechanism 1 will thus produce an increased relative deviation from the speed $$\frac{\Delta n}{n_2}$$

of the mechanism 2. By measuring the speed $n_2$, for example by means of a tachometer 5 shown in Fig. 1, the speed $n_1$ and any deviations therefrom are determined accurately.

Fig. 3 shows a device according to the invention, in which an electric motor or torque producing means 6 drives through a gear wheel transmission 7, a bevel gear wheel 8 of a differential comprising a differential pinion housing 9. In the housing 9 differential pinions 10 are distributed regularly on the periphery of the housing and journalled rotatably. The housing 9 is furthermore associated with a disc-shaped magnet arrangement 12 of permanent magnetic material, which is magnetized in accordance with the mechanisms 1 and 2 shown in Fig. 1. Opposite the magnet arrangement 12 provision is made of a corresponding arrangement 13, which is secured to a stationary part by way of a corrugated, annular plate 14. The plate 14 allows the arrangement 13 to move readily in an axial direction, whereas no motion is allowed in a tangential direction. The bevel gear wheel 15 drives a speed regulator 16, for example by means of two bevel gear wheels 17 and 18. The regulator comprises weights 19, which will exhibit a deflection in accordance with the speed of rotation. By means of a lever system 20 a control-magnitude is derived from this deflection, this magnitude acting upon a device controlling the speed of the electric motor and constituted by control-resistance 21. The control-resistance 21 may be arranged to be such that the regulator 16 has a stabilizing effect on the speed of rotation of the motor or torque-producing means 6. An effective load 27 may, if desired be coupled with housing 9 through gears 28, 7 and 8 and 10.

If the bevel gear wheel 8 is rotated with a speed $n_1$, the differential gear wheel housing 9 will assume a constant speed of rotation N, which corresponds to the mechanical resonance frequency of the vibrating system comprising the arrangements 12 and 13. The speed difference $n_2 = n_1 - 2N$ is transmitted to the bevel gear wheel 15, so that the regulator 16 assumes a corresponding speed of rotation. As in the embodiment shown in Fig. 1 in a given system having a constant mechanical resonance frequency N, deviations $\Delta n$ from the speed $n_1$ will be transmitted unchanged to the bevel gear wheel 15 and to the regulator 16. The relative deviation $$\frac{\Delta n}{n_1}$$

from the speed of the motor 6 will thus produce an increased relative deviation $$\frac{\Delta n}{n_2}$$

from the speed of the regulator 16. Thus a device is obtained, in which the control of the speed of rotation is very sensitive.

Compared with the embodiment shown in Fig. 1 the embodiment shown in Fig. 3 has inter alia the advantage that the mechanical resonance frequency of the vibrating system may be varied during operation. This variation may be obtained both in the embodiment shown in Fig. 1 and in that shown in Fig. 3 by varying the length of the springs 4 and 14, by varying the elasticity of these springs or the mass associated with the magnet arrangement 2 and 13 respectively.

In the aforesaid embodiments the arrangements 1 and 13 respectively may, of course, be suspended so as to be readily movable in a tangential direction, whereas, substantially no movement is allowed in an axial direction.

Fig. 4 shows a variant of the parts 9, 12 and 13 of Fig. 3. A differential pinion housing 9 supports, in this case, two cylindrical magnet arrangements 23 and 24 and the other mechanism is provided with a cylindrical magnet arrangement 25, so that at a rotation of the mechanism 22 the magnet arrangement 25 with the associated masses is allowed to resonate mechanically.

In a similar manner a device of the kind shown in Fig. 1 may be provided with cylindrical magnet arrangements.

The magnet arrangements shown are preferably made from a material having a ratio between the retentivity $B_r$ in gauss and the coercivity $_BH_c$ in oersted lower than 4, this material being described for example in U. S. Patents No. 2,762,777 and 2,762,778 and the dimensions are preferably chosen in accordance with the teachings of U. S. Patent No. 2,722,617.

What is claimed is:

1. An electromagnetic device having a given resonant frequency comprising a driving member being rotated at a given number of revolutions per minute, a rotatably driven member being rotated at speeds less than said given number of revolutions per minute, and a pair of proximately spaced magnetic bodies operatively connected between said driving member and driven member, at least one of said magnetic bodies being mounted on one of said members for rotating therewith, at least one of said magnetic bodies being resiliently mounted relative to the other magnetic body for vibrating said one body at substantially the same resonant frequency as the given resonant frequency of the device, the rotation of said driven member being substantially determined only by the resonant frequency of said resiliently mounted body and being derived from the rotation of said driving member.

2. An electromagnetic device having a given resonant frequency comprising a driving member being rotated at a given number of revolutions per minute, a rotatably driven member being rotated at speeds less than said given number of revolutions per minute, torque producing means connected to said driving member for rotating the same, a pair of proximately spaced magnetic bodies operatively connected between said members, at least one of said bodies being mounted on one of said members for rotating therewith, at least one of said bodies being resiliently mounted relative to the other magnetic body for vibrating said one body at substantially the same resonant frequency as the given resonant frequency of the device, the rotation of said driven member being substantially determined only by the resonant frequency of said resiliently mounted body and being derived from the rotation of said driving member, and a speed-responsive governor connected to said driven member including means connected to said torque producing means for controlling the output of said torque producing means depending upon changes in the speed of said driving member.

3. An electromagnetic device having a given resonant frequency comprising a driving member being rotated at a given number of revolutions per minute, a rotatably driven member being rotated at speeds less than said given number of revolutions per minute, torque producing means connected to said driving member for rotating the same, a differential arrangement connected between said driving and driven members, said differential gear including pinion gears, differential housing and drive gears, a pair of proximately spaced magnetic bodies operatively connected between said members, at least one of said bodies being mounted on said differential housing for rotation therewith, at least one of said bodies being resiliently mounted relative to the other magnetic body for vibrating said one body at substantially the same resonant frequency as the given resonant frequency of the device, the rotation of said driven member being substantially determined only by the resonant frequency of said resiliently mounted body, and being derived from the rotation of said driving member through said differential gear, and a speed-responsive governor connected to said driven member including means connected to said torque producing means for controlling the output of said torque producing means depending upon changes in the speed of said driven member.

4. An electromagnetic device having a given resonant frequency comprising a driving member being rotated at a given number of revolutions per minute, a rotatably driven member being rotated at speeds less than said given number of revolutions per minute, and a pair of proximately spaced disc-shaped magnetic bodies operatively connected between said members, each of said bodies being magnetized in an axial direction and having a magnetic circuit alternating in a direction along a given pitch line on said body, at least one of said bodies being mounted on one of said members for rotation therewith, at least one of said bodies being resiliently mounted relative to the other magnetic body for vibrating said one body at substantially the same resonant frequency as the given resonant frequency of the device, the rotation of said driven member being substantially determined only by the resonant frequency of said resiliently mounted body and derived from the rotation of said driving member.

5. An electromagnetic circuit as claimed in claim 4 in which the magnetic bodies are constituted of permanent magnet material in which the retentivity $B_r$ in gauss is less than one-fourth the coercivity $_{13}H_c$ in oersteds.

6. An electromagnetic device having a given resonant frequency comprising a driving member being rotated at a given number of revolutions per minute, a rotatably driven member being rotated at speeds less than said given number of revolutions per minute, and a pair of proximately and concentrically spaced annular bodies operatively connected between said members, each of said bodies being magnetized in their radial direction, at least one of said bodies being mounted on one of said members for rotating therewith, at least one of said bodies being resiliently mounted relative to the other magnetic body for vibrating said one body at substantially the same resonant frequency as the given resonant frequency of the device, the rotation of said driven member being substantially determined only by the resonant frequency of said resiliently mounted body and being derived from the rotation of said driving member.

References Cited in the file of this patent
UNITED STATES PATENTS

| | | |
|---|---|---|
| 1,368,755 | Roddy | Feb. 15, 1921 |
| 1,883,163 | Van Voorhis | Oct. 18, 1932 |
| 2,616,298 | Clifford | Nov. 4, 1952 |